United States Patent
He et al.

(10) Patent No.: US 7,718,928 B2
(45) Date of Patent: May 18, 2010

(54) MULTIFUNCTION AND SAFE ELECTRIC PRESSURE COOKER

(76) Inventors: Zhigang He, No. 6, Southern Rong Gui Da Road, Ronggui Town, Shunde District, Foshan, Guangdong, 528305 (CN); Zhibin Huang, No. 6, Southern Rong Gui Da Road, Ronggui Town, Shunde District, Foshan, Guangdong, 528305 (CN)

( * ) Notice: Subject to any disclaimer, the term of this patent is extended or adjusted under 35 U.S.C. 154(b) by 720 days.

(21) Appl. No.: 11/640,061

(22) Filed: Dec. 15, 2006

(65) Prior Publication Data

US 2008/0142498 A1 Jun. 19, 2008

(51) Int. Cl.
*A47J 27/086* (2006.01)
*A47J 27/09* (2006.01)
*A47J 27/092* (2006.01)
*A47J 27/08* (2006.01)

(52) U.S. Cl. ................... 219/431; 219/441
(58) Field of Classification Search ................. None
See application file for complete search history.

(56) References Cited

U.S. PATENT DOCUMENTS

| 2,771,536 | A * | 11/1956 | Page ................. 219/431 |
| 6,173,643 | B1 * | 1/2001 | Qian et al. ........... 99/339 |
| 6,283,014 | B1 * | 9/2001 | Ng et al. ............. 99/330 |
| 2009/0095166 | A1 * | 4/2009 | Jian ................... 99/330 |

* cited by examiner

*Primary Examiner*—Joseph M Pelham
(74) *Attorney, Agent, or Firm*—Vic Lin; Myers Andras Sherman LLP (57) ABSTRACT

A multifunction safe electric pressure cooker includes a lid, an outer body, a warming container, a control panel, an inner tank, a sealant washer, a heating plate under the inner tank, and a control device. The control device comprises a control circuit, a pressure switch, and a temperature control device. The lid has a floating valve, a pressure discharging valve, and a safety valve. Between the heating plate and the warming container there is a spring device. Under the heating plate is a pole. The control device employs a sensor to determine whether the inner tank is placed in the cooker. Between the lid and the body sets a lid safety control switch that connected to the control circuit. The electric pressure cooker is more convenient and durable, can fry and sauté food, and includes multiple safety devices.

19 Claims, 9 Drawing Sheets

MULTIFUNCTION AND SAFE ELECTRIC PRESSURE COOKER

FIELD OF THE INVENTION

The present invention relates to an electric pressure cooker, and in particular to a practical and newly developed type of cooker.

BACKGROUND OF THE INVENTION

Because of the convenience and energy savings, electric pressure cookers are more and more accepted. However, since electric pressure cookers have pressurized containers, safety is an important concern.

A conventional electric pressure cooker always provides an unvarying warming temperature that cannot be adjusted to prevent unsafe complications, such as cooking without water. Thus, conventional pressure cookers have limitations, such as the inability to adjust the cooking pressures and cooking temperatures, which render conventional pressure cookers as energy consuming, single functioning, limited, and lacking in adequate safety features.

Typical multifunction electric pressure cookers have a control device that often connects the fuse, timer, thermostat and heating plate in a series—parallel configuration. The fuse, thermostat and heating plate are connected in series in the electric loop circuit, while the heating light and the keep warm light are on the panel of the control device. The shortcoming of foregoing control device is that, when one of the protected devices such as the thermostat and the pressure switch is broken, the whole device is of no use. Furthermore, when the pressure discharging valve is placed incorrectly or any other event that causes a discharge of steam occurs, or the steam in the cooker is not of sufficient pressure to force the pressure switch to open, the cooker will overheat which may cause an accident.

Furthermore, conventional electric pressure cookers commonly lock the body and the lid with a flange near the edge of the lid that engages a groove near the upper edge of the body. The body and the lid are locked in place by rotating the lid relative to the body. This setup is simple but inconvenient. Another type of the pressure cooker employs a tightly locked lid setup. The setup relies on a lock hoop in the groove of the lid, a manual control device, and a transmission from a manual control device to the lock hoop. The lock hoop has a space for expansion. The lock hoop lies in a horizontal flat plane. The transmission device is in the handle, which is composed with a trigger-connected motor device and connected with the lock hoop. The motor device can make the lock hoop expend through the gear. The foregoing setup offers some improvements, but there is still room to improve. For example, the slippage caused by opening and closing the lid will wear and tear the conjunct plane. Thus, conventional cookers are difficult to use and do not offer adequate safety features.

SUMMARY OF THE INVENTION

The goal of this product is to provide an electric pressure cooker that is convenient and durable, that can fry and saute food, and has multi-function protection devices such as open-and-close-lid-safety-controls.

For the foregoing goal, our new product solves the problem as described below:

This multifunction safe electric pressure cooker is made up of a lid, an outer body, a warming container, a control panel, a pressure cooker inner pot, a seal, a heating plate that is positioned under the bottom of the inner pot, and a control device that has a circuit, a pressure switch, and a thermostat. The temperature control device and the pressure switch are under the warming container, and a floating pressure discharging valve is placed in the lid. Between the heating plane and the warming container is a spring device. The control device also comprises safety features such as a response device under the heating plate to check the inner pot and a security switch between the lid and the body to check whether the lid is locked correctly. All the switches are connected with the control circuit.

The foregoing spring device is a U shaped spring that can be arranged uniformly in two or more configurations. The upper surface of the U shaped spring is connected to the heating plate and the bottom surface of the U shaped spring is connected to the warming container. One end of the pressure switch is under the pole and the other end is riveted to the warming container.

Between the lid and the body there is a locking device that includes lid buckles at the edge of the lid, which can be connected to the body and comprise a middle ring or an inner pot, and a transmission device that is connected to the lid buckles, which locks the lid to the body. The foregoing lid buckles are coupled to the lid by the hinge axis. The transmission device is made up of a ring shaped slider riveted to the lid. One of the ends of the edge of the ring shaped slider has a runner slot. The size of the runner slot is the same with as lid buckle. One end of the lid buckle inserts into the runner slot. The transmission device is also connected to a drive device that makes it slip in a hoop. The buckle in the runner slot follows the ring shaped slider to rotate and swing, so the lid can be locked.

To explain more clearly, the drive device is a pole coupled to the lid and connected to the ring shaped slider.

The drive device is made up of the motor and the pole connected to the motor. One end of the pole is connected to the slider. There is a wheel connected to the motor, and the pole is in the deflective center of the wheel.

The lid buckle is at the edge of the lid.

The upper surface of the ring shaped slider has a runner slot. Between the runner slot and the lid is a stop bolt that can restrict the movement of the slider.

The control circuit comprises a microprocessor. One or more embodiments of the present invention include a temperature sensing device in the center of the heating plate, a sensor to check for the presence of the inner tank, an open and close lid switch, a pressure control switch, and a pushbutton switch. The output of the control circuit comprises the heating plate, the indicator device such as LED lights, or an LCD.

One side of the temperature controller is connected to the coupling of the thermostat and the pressure control switch, while the other side is connected to the timing switch. This makes the temperature controller in series with the thermostat or the pressure control switch, and then connects in parallel to the timing switch. The temperature controller can be in series with the timing switch directly.

Benefits of one or more embodiments of the present invention are listed below:

1. A user can move the ring shaped slider manually with the rotary handle or an electrical device may drive it. The rotating movement of the transmission device assists the slider to achieve up-and-down movement, and then drives the lid buckle to swing. The slider can avoid abrasion of the lid and the middle ring or the inner tank, and improve longevity. The use of the present invention can be convenient and energy saving.

2. Safety is improved and there are many buckles to lock the body.

3. The present invention is easy to repair. If the lid buckles break, a user can replace the broken lid buckles, thus saving repair costs.

4. One embodiment of the electric pressure cooker employs discrete devices. Thus, if any of the thermostats, temperature controllers or pressure control switches in the circuit become broken, the other devices will continue to operate. The electric pressure cooker safety improvements help prevent accidents from occurring.

5. An embodiment of the present electric pressure cooker uses microprocessor control. The microprocessor control circuit can adjust the warming time and the temperature, which offers advantages to conventional electric pressure cookers that have a constant warming temperature that is fixed and immutable. Hence, the average heating power can be adjusted by the microprocessor control in the present invention, which wastes less energy as compared to conventional electric pressure cookers. Furthermore, the microprocessor control can adjust the pressure in the inner tank of the present invention, which is in contrast with conventional electric pressure cookers that have a fixed cooking pressure that wastes energy.

6. The present invention offers several safety control devices including a temperature control sensor, a pressure control sensor, a sensor to determine whether the inner tank is placed within the electric pressure cooker, a sensor to monitor whether the lid is opened. These safety control devices ensure the safety and convenience to the user.

7. The present electric pressure cooker has a signal light or switch to indicate whether the inner tank is in the cooker, thus preventing the heating plate from working without the inner tank, which makes the electric pressure cooker safer than conventional pressure cookers.

8. The present electric pressure cooker has a pressure signal light or switch, which can control the temperature and the pressure, and offer enhanced safety features. At the same time, the pressure can be adjusted by the pressure control bolt.

9. The present pressure cooker product can sauté and fry by controlling the temperature, which increases the functionality of the cooker.

10. The inner tank is in the shape of an enlarged ellipse, which increases the ease of placing food in the inner tank.

11. The present electric pressure cooker product uses many safety devices, such as a safety valve, a floating valve, a spring device, and a pressure discharging valve to ensure that the inner tank is sealed. The pressure switch maintains a working pressure in the tank. If the pressure exceeds the working pressure, the excess pressure will trigger the pressure switch, which turns off the power to the pressure cooker. Excess pressure is discharged to ensure safety.

The following list is a legend of the numbering of the above illustrations:

1. Lid; 2. Outer body; 3. Heating plate; 4. Spring device; 5. Warming Container; 6. Pole; 7. Pressure switch; 8. Inner tank; 9. Middle ring; 10. Sealant washer; 11. Slider; 12. Pull-rod; 13. Lid buckle; 14. Microprocessor control panel; 15. Microprocessor control PCB; 16. Power supply PCB; 17. Floating valve; 18-1. Safety valve; 19. magnetic switch; 20. Heat insulating device; 21. Metal Heat conducting body; 22. Temperature sensor; 23. Insulator; 24. Down-leads of the temperature sensor; 25. Contact of the adiabatic ring; 26. Down-leads of the temperature sensor; 27. Control circuit; 28. Metal touch point under the insulator; 29. Contact on the insulator; 30. Contact on the adiabatic device; 31. Thermostat; 32. Temperature controller; 33. Multifunctional switch box; 34. Multifunctional light panel; 35. Timer; 36. Slider restricting bolts; 37. Handle fixing bolt; 38. Revolving handle; 39. Lid cover; 40. Poker; 41. Pressure board bolt; 42. Pressure board; 43. Bracket ream axes; 44. Lid buckle bracket; 45. Runner slot on the landscape orientation; 46. Motor; 47. Runner slot on the edge.

DETAILED DESCRIPTION OF THE PREFERRED EMBODIMENTS

FIGS. 1 through 5 depict examples of the Multifunction and safe electric pressure cooker, which has a Microprocessor controller. The pressure cooker comprises lid 1 which has a floating valve 17, a pressure discharging valve 18, a safety valve 18-1, a lid handle 38, a lid cover 39, a sealant washer 10 and inner tank 8, a middle ring 9, a warming container 5, an outer body 2, a water collector, a heating plate 3, a pedestal tank body which comprises Microprocessor controller and control device. The floating valve is under the slider. Because of gravity, the pressure-discharging valve will block up the vent-pipe. Normally, in the range of the working pressure controlled by the pressure switch, the vent-pipe will not allow release of steam. When the pressure switch is out of order and the pressure rises to a certain degree, however, the pressure will push the pressure-discharging valve to let the steam out through the vent-pipe to ensure the safe operation. The pressure cooker has s a control panel 14 on the outer body 2. On the panel there is a PCB 15 that comprises indicator lights, a microprocessor and a keyboard. The Power supply PCB 16 is disposed in the pedestal. The lid buckle 13 is located between lid 1 and the body. Coupled to the lid are a slider 11, and poker 12. The control device comprises the thermostat device, pressure switch 7 and the control switch. The pressure switch 7 is located under the pole 6, which is under the heating plate 3. The floating valve 17 and the pressure discharging valve is located at the top of the lid 1. Located between the heating plate 3 and warming container 5 is the spring device 4, which is made up of U shaped spring 4. The spring device 4 is equally spaced between the heating plate and warming container 5. The upper side of the U shaped spring 4 is connected with the heating plate 3, while the bottom side is coupled to the warming container.

Figure 6:
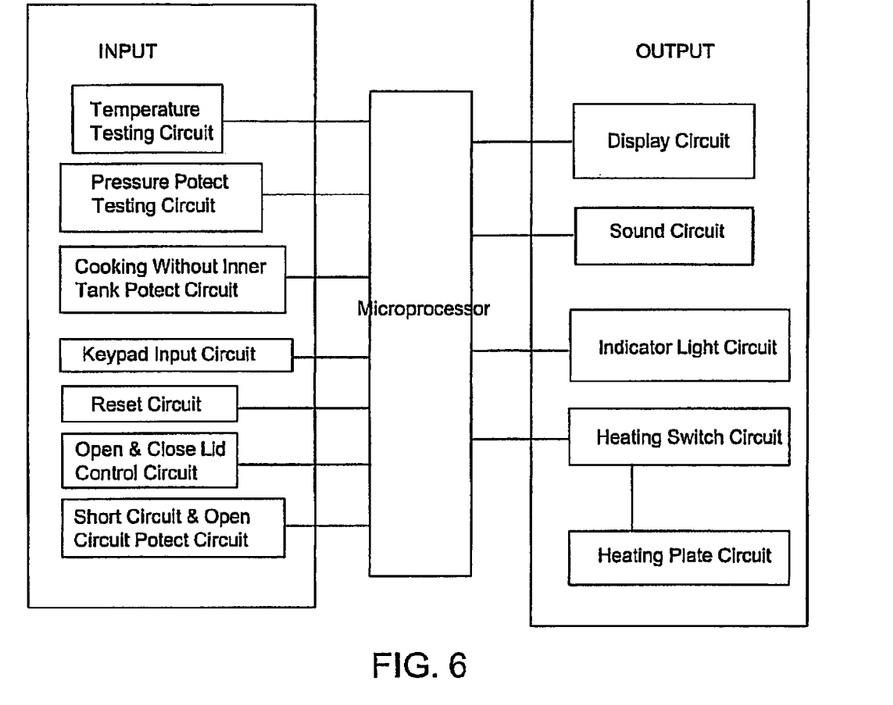
FIG. 6 illustrates the circuit diagram of the electric pressure cooker illustrated in FIG. 1.

FIG. 6 depicts an exemplary circuit diagram of the multifunction and safe electric pressure cooker with the microprocessor controller. The control circuit is made of a single chip according to one or more embodiments of the invention. The heating plate 3 comprises a temperature sensor device 22 that has thermal resistance in it. An open and close lid safety control switch 19 is disposed between the lid 1 and the body. The single chip control circuit comprises the input and output portions of single chips. The input of the microprocessor controller includes a temperature control signal, a sensor switch, a sensor to indicate whether the inner tank is set within the pressure cooker, an open and close lid safety control switch 19, a pressure input control switch, and a keyboard. The output part of the microprocessor includes a heating plate control circuit, a display, a signal light control circuit, and a sound hint control circuit.

Figure 7:
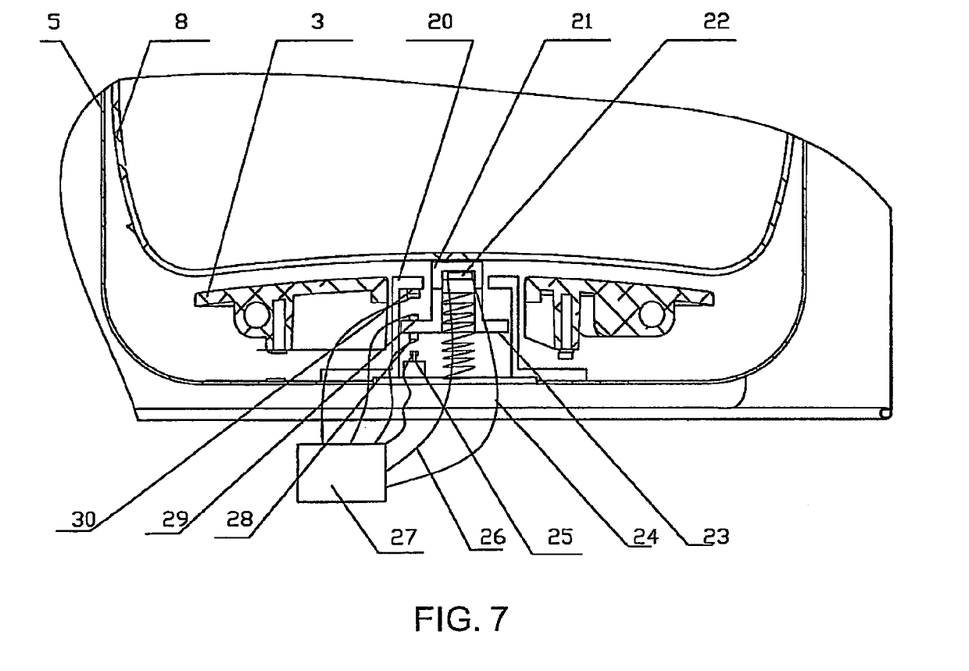
FIG. 7 illustrates lowermost details of the structure of the tank of the electric pressure cooker illustrated in FIG. 1.

As FIG. 7 illustrates, the temperature control device and the pressure and inner tank detection device are disposed between the heating plate 3 and the warming container (adiabatic plate) 5. The temperature sensor device 22 is disposed in the hole of the heating plate 3. The two signal down-leads 24, 26 and the controller's control circuit 27 make up the temperature control signal switch. Between the surface of the temperature sensor 22 and the heating plate 3, there is an adiabatic device 20, which is an adiabatic ring and is made from bakelite. In one embodiment of the invention a metal heat conducting body 21 is located at the top of the temperature sensor 22, while an insulator 23 is coupled under the temperature sensor. The insulator may be Bakelite and made of a cap shaped buckle on the temperature sensor with the metal heat conducting body. On the top and bottom of the surface of the insulator 23 there are protruding metal contacts 28, 29, which comprises a metal pole together. The adiabatic device 20 above the insulator 23 has the same metal contact 30. The two metal contacts 29, 13 and the controller control circuit 27 generate the signal or creates the switch as to whether the inner tank is placed in the pressure cooker or not. The metal contact 28 at located the bottom of the warming container also has a same contact 25. Contact 25 can be an adjustable bolt fixed to the bottom of the safety control device to adjust the sensed pressure in the tank.

In one embodiment of the invention the electric pressure cooker will disable the cooking process if the inner tank is not detected within the cooker. As the pressure increases within the electric pressure cooker, metal contacts 28 and 25 will come in contact with one another and allow the generation of the pressure signal. The controller may then adjust the heating temperature according to this pressure signal. The two down-leads of the temperature sensor 22 are connected to the single chip control circuit, allowing the controller to adjust the heating temperature according to its temperature signal.

Figure 2:
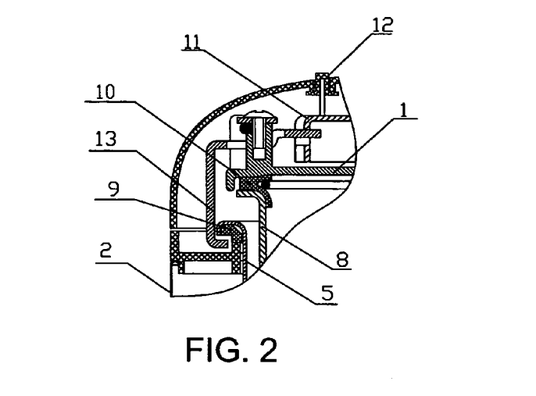
FIG. 2 illustrates the lid joint part structure of the electric pressure cooker illustrated in FIG. 1.
Figure 3:
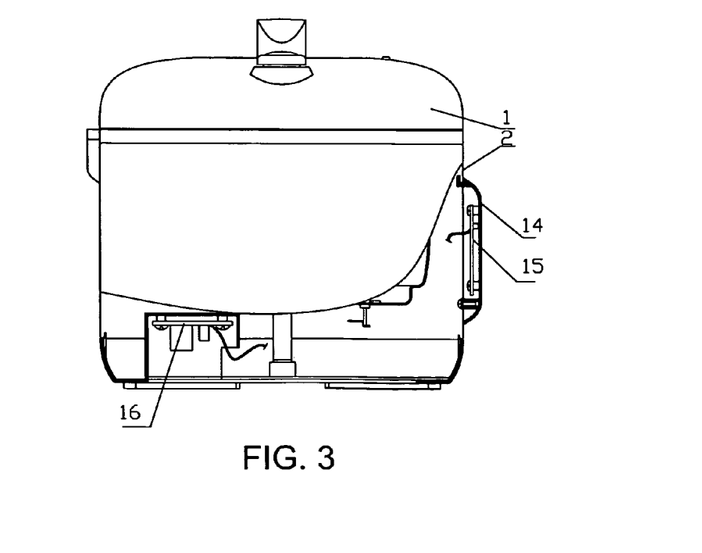
FIG. 3 illustrates the side part structure of the electric pressure cooker illustrated in FIG. 1.
Figure 4:
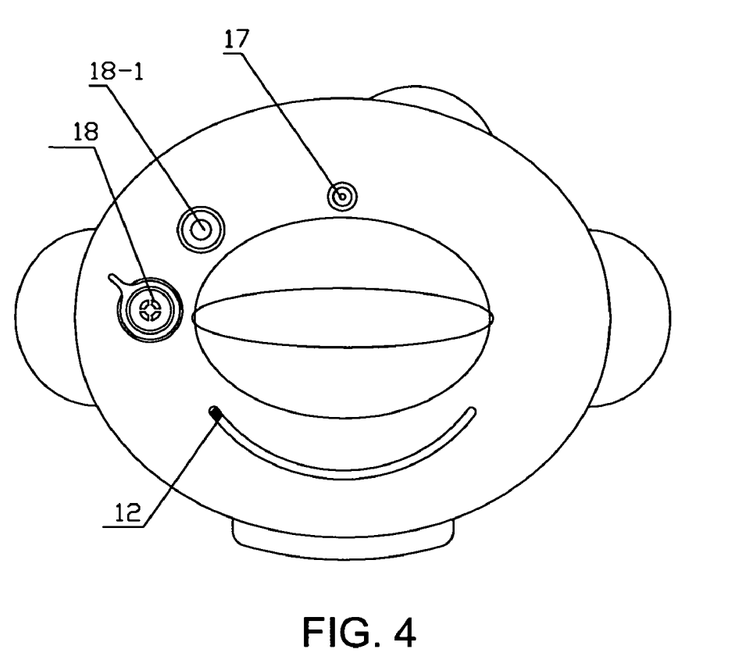
FIG. 4 illustrates the platform of the electric pressure cooker illustrated in FIG. 1.
Figure 5:
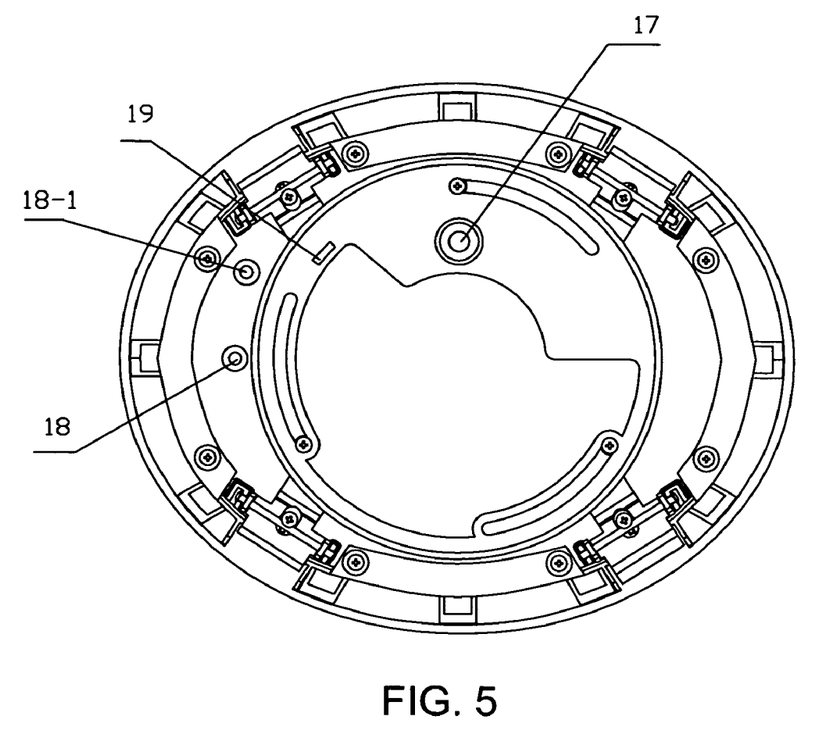
FIG. 5 illustrates the inner structure of the lid of the electric pressure cooker illustrated in FIG. 1.

FIGS. 2 and 3 illustrate the electric pressure cooker comprising a lid 1 and a body. In one embodiment of the invention a lid control switch is disposed between the lid and the body. This control switch is connected to the electrical source and the heating plate 3, and also connected to the control circuit. The control switch monitors whether the lid is opened or closed, and sends the signal to the single chip of the control circuit. The microprocessor controls the relay to switch on or off the heating plate. The single chip controls the electric pressure cooker. The single chip can provide a warning signal through the change signal of the control switch's state. The lid control switch comprises the lid 1 and the Reed Switch 19. As FIG. 5 illustrates, the upper plane of the handle on the body is located under one side of the handle of the lid 1, while a magnet is located under one side of the lid handle and the Reed Switch is located on the upper plane of the handle on the body. When the lid closes, it is inserted into the groove of the body's edge. When the lid completes closed, the reed switch closes, and the controller can energize the heating plate.

The lid control switch may comprise a touch switch or photovoltaic switch setting between the lid and the body as one of the example of this product.

Figure 8:
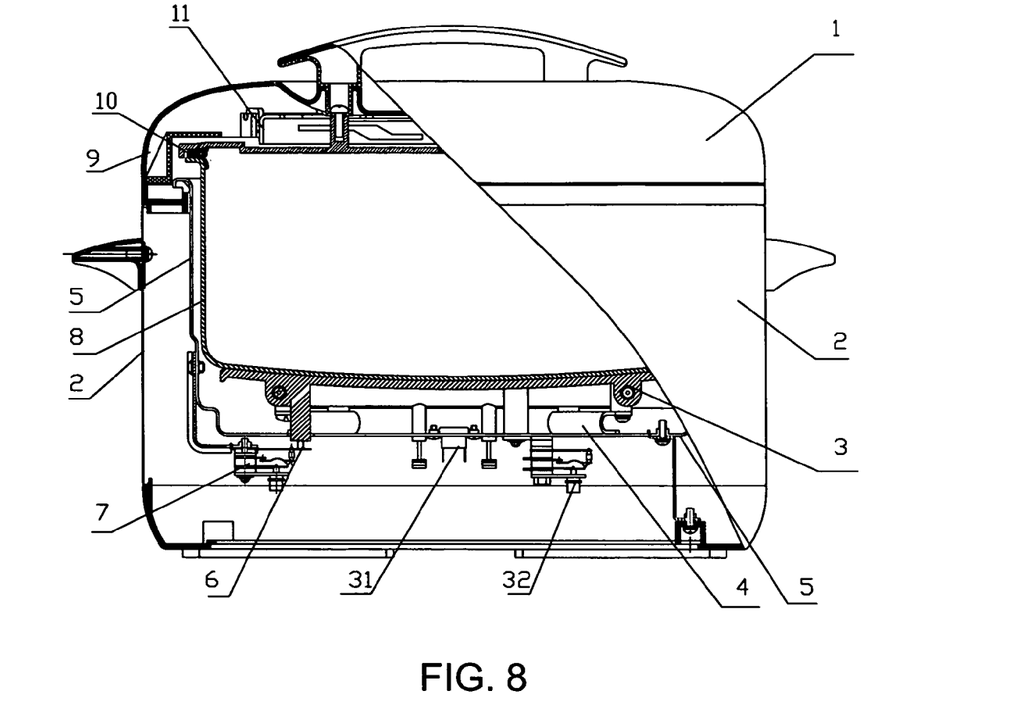
FIG. 8 and FIG. 9 illustrate a structure diagram of the mechanical switch part cutaway of the electric pressure cooker illustrated in FIG. 1.
Figure 9:
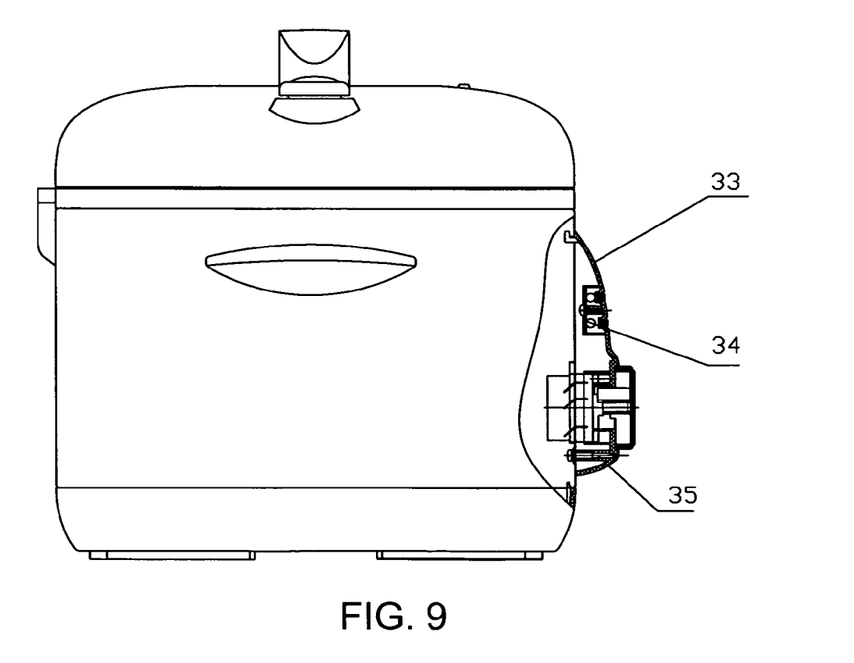
Figure 10:
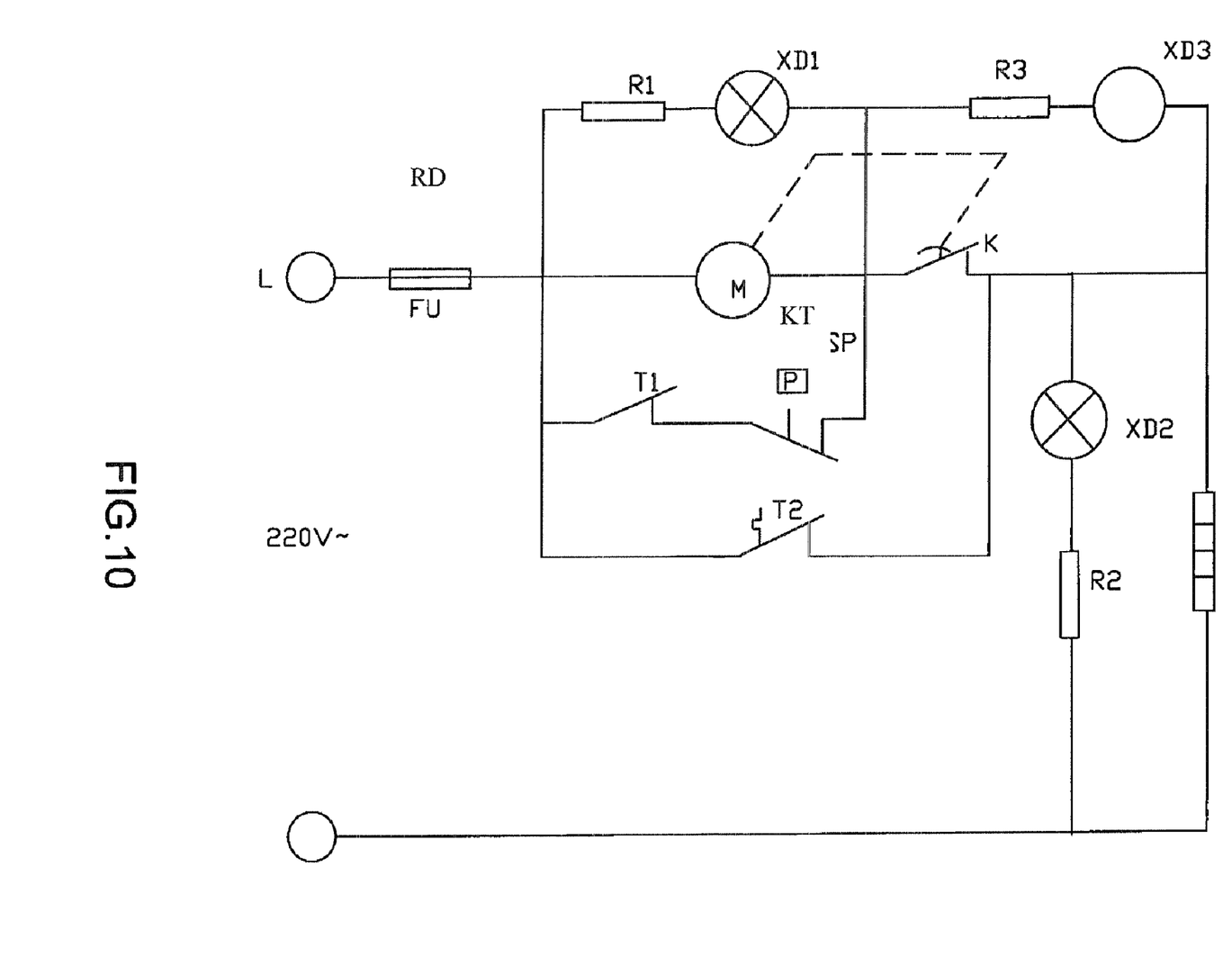
FIG. 10 illustrates a circuit diagram of the mechanical switch part circuit of the electric pressure cooker illustrated in FIG. 1.

FIGS. 8, 9, and 10 illustrate an embodiment of the invention that employs discrete devices including a control switch that is mechanical structured, a mechanical panel 33, in which there is a light board 34 and a timer 35. Some embodiments of the invention include a thermostat 31, and a temperature controller 32. The control circuit is made of an ultrahigh temperature protector RD, a timer M, a timer switch K, and heating thread in the heating plate R in series. The temperature control device comprises a thermostat T2 and a temperature controller T1. The thermostat T2 (31), pressure adjusted switch KT, and timer M (35) comprise the circuit. One side of the temperature controller is coupled to the connection of the thermostat T2 and the pressure adjusted switch, while the other side is coupled to the timer switch. In one embodiment of the invention a heating light XD1 is placed in series with resistance R1, which parallel connects to both sides of the timer M. A warming light XD2 is coupled in series with resistance R2, which parallel connects to both sides of the timer switch K. A heating light XD3 in series with resistance R3, which connects both sides of the heating thread of the heating plate in parallel.

Figure 1:
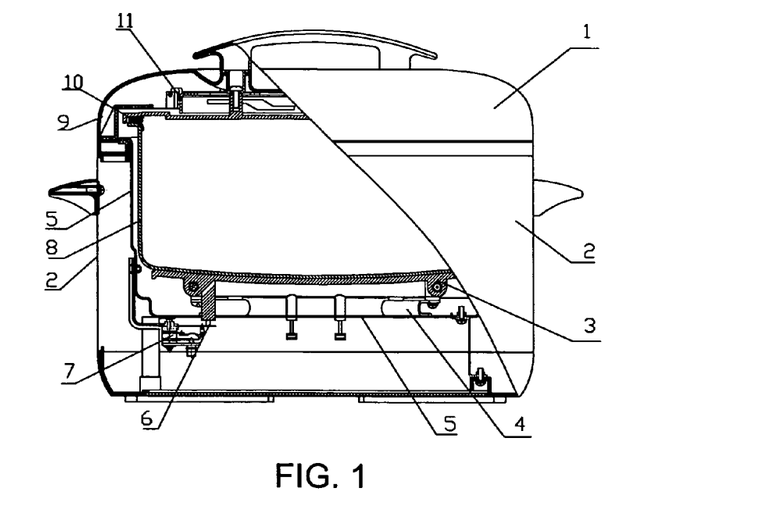
FIG. 1 illustrates a structure diagram of a practical and newly developed type of electric pressure cooker (Microprocessor type) according to an embodiment of the present invention.

It should be noted that in some embodiments of the invention the pressure adjusted switch KT and the thermostat T2 may be changed in position from the circuit illustrated in FIG. 10, as well as the other elements illustrated in FIG. 1. At the same time, the temperature controller T1 can be connected in parallel with the timer switch K directly.

Figure 11:
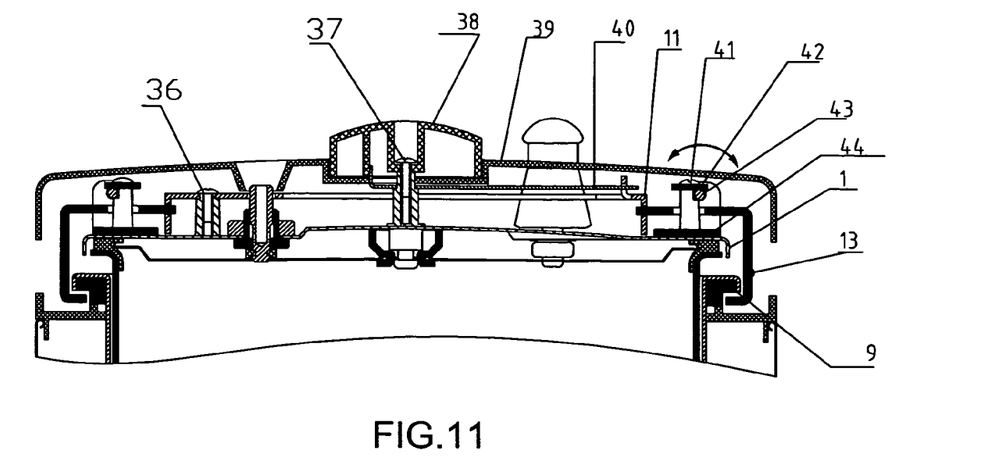
FIG. 11 illustrates the lid structure of one of the practical and newly developed type of electric pressure cooker illustrated in FIG. 1.
Figure 12:
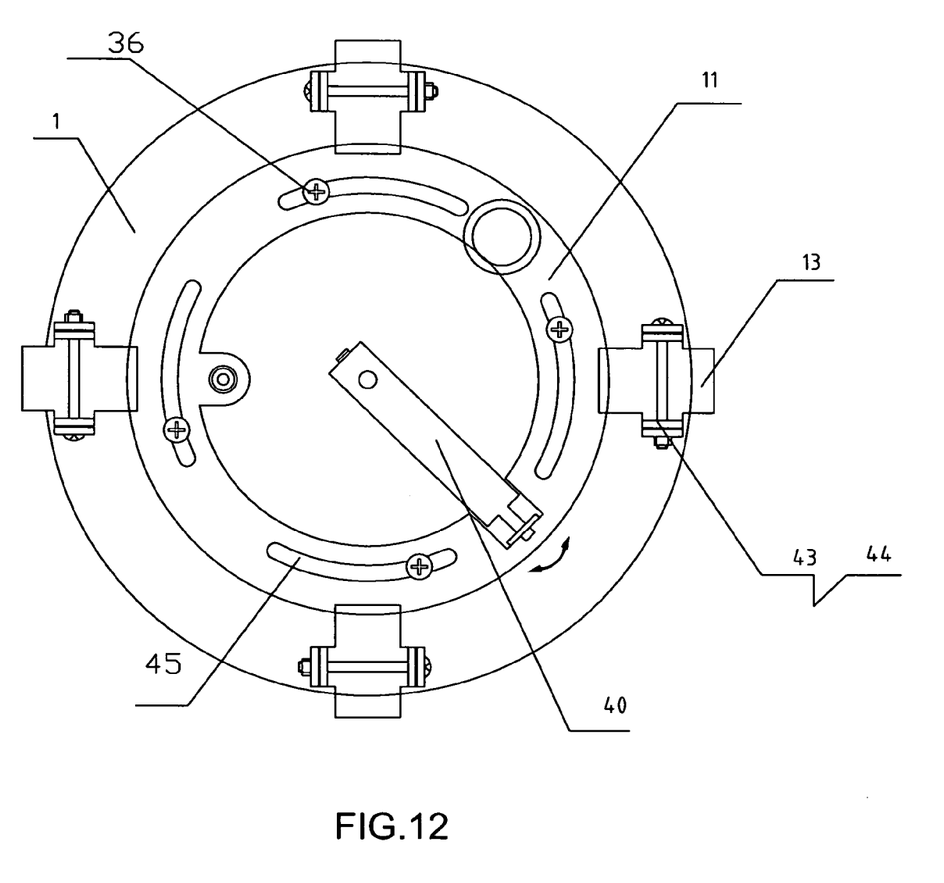
FIG. 12 illustrates the platform of the embodiment illustrated in FIG. 11.
Figure 19:
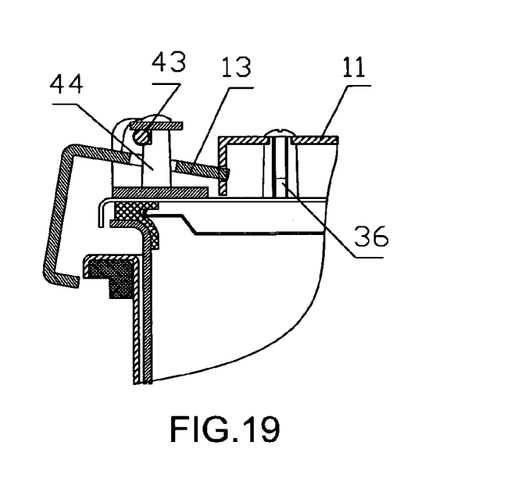

As FIGS. 11 and 12 illustrate, a lock device is located between the lid and the body. The lock device comprises the lid buckle 13 coupled on the edge of the lid 1 that can be fastened to the middle ring of the body. A transmission device is configured to swing the lid buckle 13. In one embodiment of the invention one or more lid buckles 13 are coupled to the lid 1. In this exemplary embodiment, there are four lid buckles 13. The lid buckles 13 are equally arranged on the edge of the lid 1. The lid buckles 13 are fixed to the lid by the lid buckles bracket 44. The lid buckles bracket has the bracket axes 43 to couple the lid to the lid buckles 13. Pressure board 42 is coupled to lid buckles bracket 44. The pressure board 42 is fixed to bracket 44 by the pressure board bolt 41. This transmission device is made of the ring shaped slider 11 that actively fixes to the lid 1. As FIG. 19 illustrates, there are runner slots 47 with the same amount of the buckles shown on the edge of the slider. One end of the lid buckle inserts into the runner slot 47. There are landscape-orientated runner slots 45 on the upper side of the said slider 11. Between the landscape-orientated runner slots 45 and the lid 1, slider restrict bolts 36 are disposed. The transmission device is also connected to the driving device. The driving device comprises of the revolving handle 38. The poker 40 is connected to the bottom of the revolving handle 38. One end of the poker 40 is connected actively to the slider 11. In one embodiment of the invention, there is a hole in slider 11, and the end of the poker 40 inserts into the hole to move the slider. The revolving handle 38 is fixed to the middle of the lid 1 by the handle-fixing bolt 37. The poker 40 and slider 11 are in the cover of the lid 39.

Figure 18:
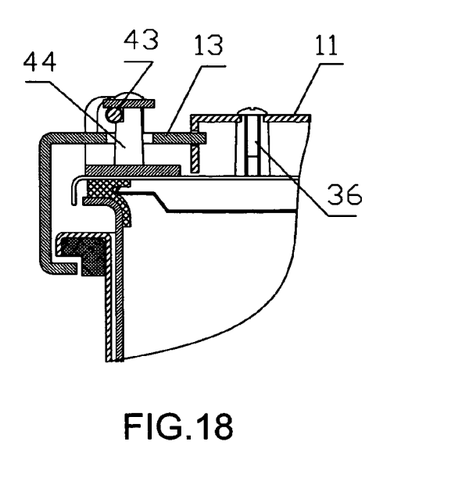
Figure 20:
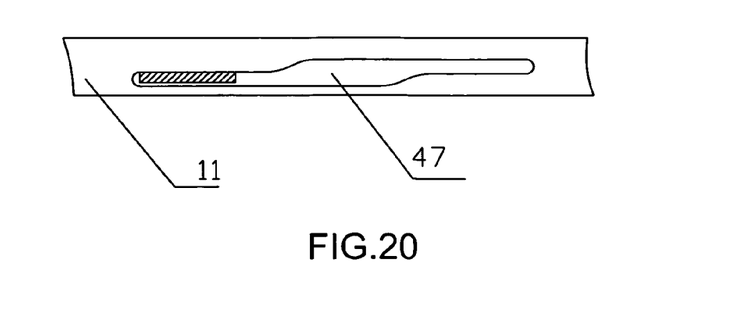
FIG. 20 illustrates the structure of the edge of the slider in the practical and newly developed type of electric pressure cooker.

As the lid is locked into place, the user turns the revolving handles 38 to make the poker 40 move the slider to roll. The side runner slot 47 of the slider 11 is a runner slot that is not in the same plane. As illustrated in FIG. 20, the lid buckles are made to swing to allow locking or opening. FIGS. 18 and 19 show locking and opening.

Figure 13:
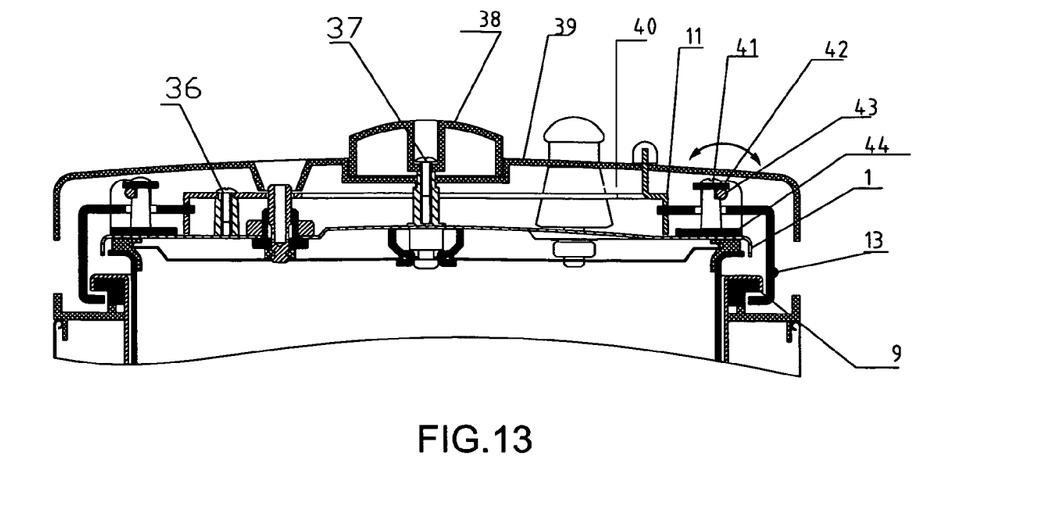
FIG. 13 illustrates the lid structure of the practical and newly developed type of electric pressure cooker according to one embodiment of the present invention.
Figure 14:
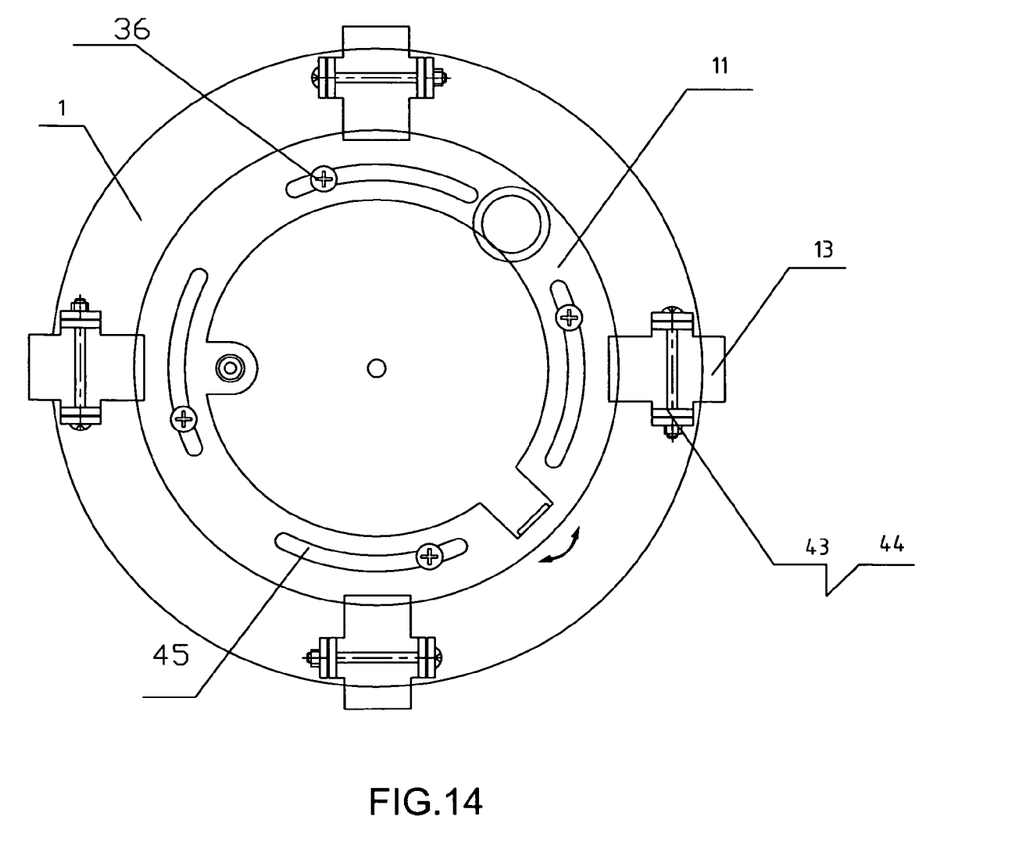
FIG. 14 illustrates the platform of the electric pressure cooker illustrated in FIG. 13.

FIGS. 13 and 14 illustrate an embodiment where the driving device comprises the poker with a handle, which is connected directly to the ring shaped slider 11.

Figure 15:
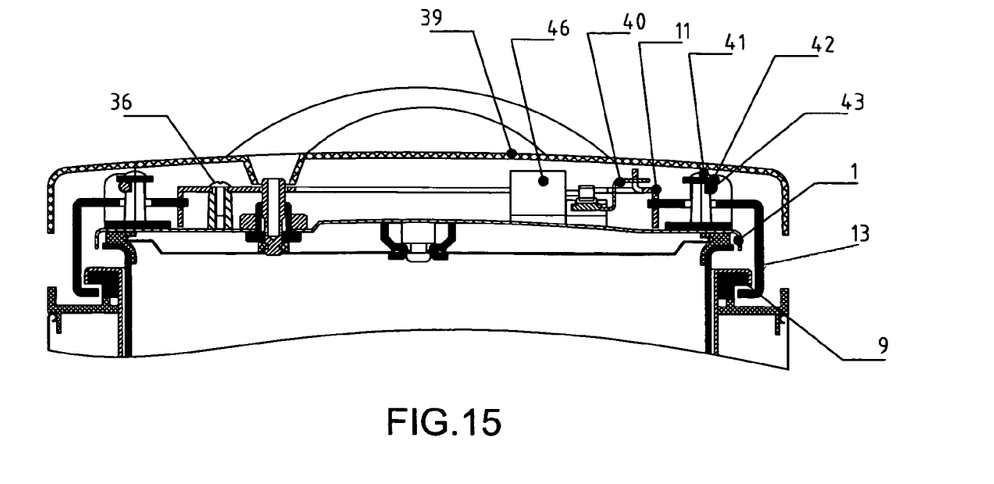
FIG. 15 illustrates a structure diagram of the structure of the lid according to one embodiment of the invention.
Figure 16:
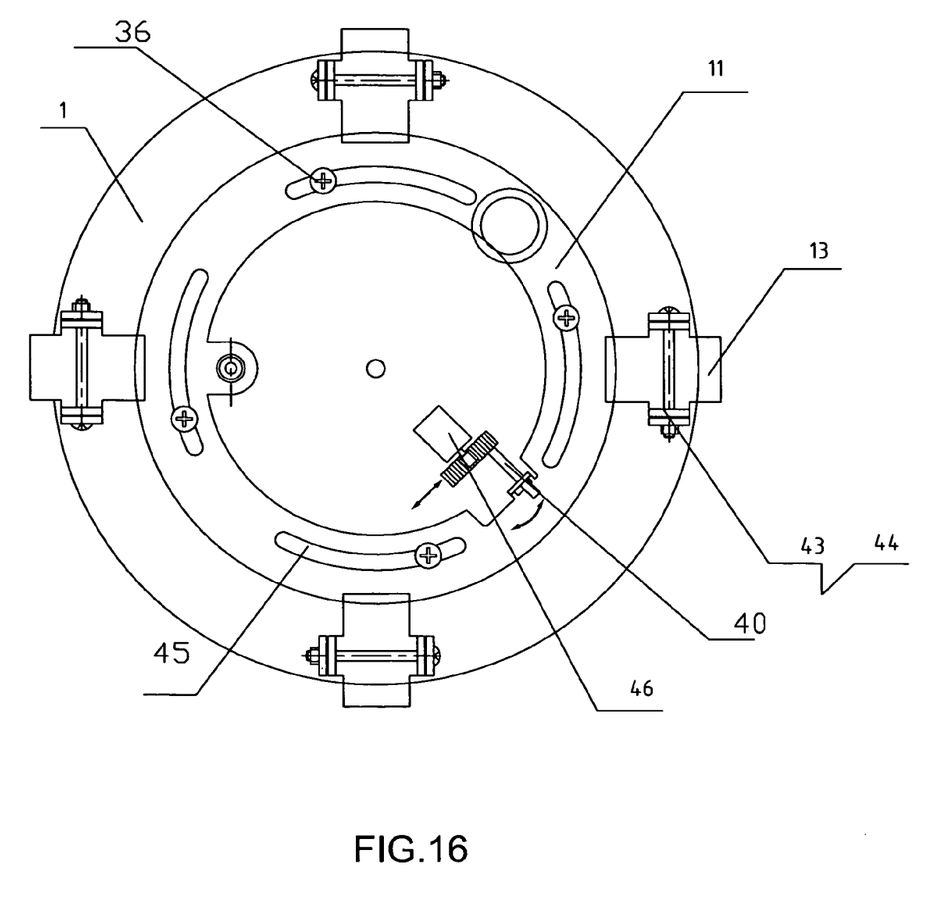
FIG. 16 illustrates the inner part platform of the practical and newly developed type of electric pressure cooker.

FIGS. 15 and 16 illustrate an embodiment where the driving device comprises the motor and the poker 40 connected to it. The poker's end is connected actively to the slider. A wheel is coupled on the axes of the motor. The poker 40 is on the eccentricity of the axes.

When this product is powered and turned on, it can control the lock intelligently by use of the control motor.

Figure 17:
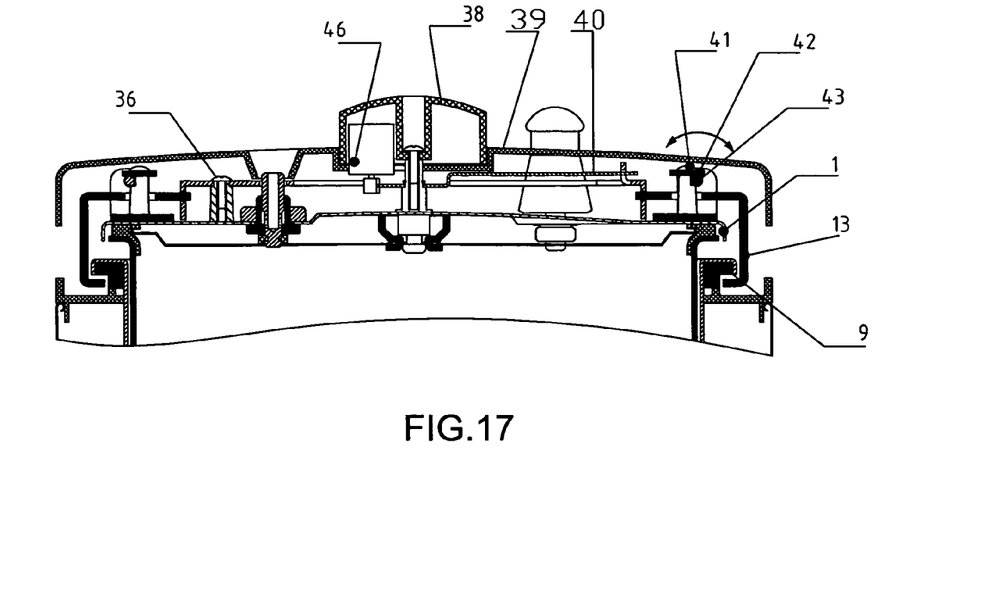
FIG. 17 through FIG. 19 illustrate the structure of the lid when locked or unlocked.

FIGS. 17 and 18 illustrate an embodiment that is configured to operate by either turning the handle by hand or through the use of a motor. The difference between the motor 46 controls and the embodiment illustrated in FIG. 13 is that in motor 46 controls the locking and unlocking. The poker 40 is a gear-driven poker. The motor's gear drives the poker 40 in order to move the poker 40 for locking the lid.

The pressure control and the protection working elements of this product are as below:

When the pressure cooker is electrified and starts heating, the inner tank is heated and the hot air discharges through the floating valve.

When the heating reaches a certain temperature, steam is formed in the inner tank and discharges through the floating valve.

As the cooker continues to heat, pressure formed by the steam is strong enough to activate the floating valve, and the inner tank becomes an airproof environment.

As the cooker heats, the pressure in the inner tank acts upon the bottom of the tank, such that the heating plate and the spring device force the inner tank and the heating plate both to move down.

When the pressure exceeds the pressure limit, the movement of the heating plate leads to the cut off of the heating. The turn off signal is sent to the control circuit to stop heating.

When the heating stops, the pressure in the inner tank will decrease, and the spring device makes the heating plate and the inner tank return to their original position, and the pressure switch will turn on again. The signal is sent to the control circuit to reheat. This process will repeat to ensure the pressure remains in a certain range. When the cooking time is complete, the cooker with stop the cooking process.

We claim:

1. A multifunction safe electric pressure cooker comprising:
    a lid;
    an outer body;
    a control panel;
    an inner tank;
    a sealant washer;
    a heating plate positioned under said inner tank;
    a warming container wherein a lowermost surface of said warming containing is positioned below said heating plate, wherein a bottom of said warming container comprises an opening;
    one or more springs coupling said heating plate and said warming container;
    a pole, wherein an upper end of said pole is coupled with said heating plate and a bottom end of said pole extends beyond said opening in said warming container;
    a control device, wherein said control device comprises a control circuit, a pressure switch, a temperature control device, and an inner tank sensor under said heating plate, wherein the inner tank sensor is configured to sense whether the inner tank is placed in the warming container;
    a safety lid control switch, wherein the safety lid control switch is configured to detect the presence of said lid, wherein said safety lid control switch is connected to said control circuit;
    wherein said pressure switch is located below said bottom end of said pole;
    wherein said temperature control device is located under said warming container;
    wherein said lid comprises a floating valve, a pressure discharging valve, and a safety valve.

2. The multifunction safe electric pressure cooker of claim 1, wherein said one or more springs further comprises two or more U shaped springs.

3. The multifunction safe electric pressure cooker of claim 1, further comprising a locking device between said lid and said body, wherein said locking device comprises one or more lid buckles on an edge of said lid, and a transmission device connected to said one or more lid buckles, wherein said transmission device is configured to engage said one or more lid buckles.

4. The multifunction safe electric pressure cooker of claim 3, wherein said one or more lid buckles is coupled to said lid by one or more ream axes, wherein said transmission device further comprises a ring shaped slider coupled on said lid, wherein the edge of said slider is configured with one or more runner slots, wherein one end of each lid buckle is coupled to each runner slot, wherein said transmission device is configured to engage one or more lid buckles.

5. The multifunction safe electric pressure cooker of claim 1, wherein shape of said lid, said body and said inner tank is elliptic.

6. The multifunction safe electric pressure cooker of claim 4, wherein said transmission device further comprises a ring shaped slider connected directly to a poker with a handle.

7. The multifunction safe electric pressure cooker of claim 4, wherein said driving device further comprises a revolving handle and a poker under a revolving handle, wherein one end of said poker connects to a slider and another end connects with said revolving handle.

8. The multifunction safe electric pressure cooker of claim 4, wherein said driving device further comprises a synchronous motor and a poker, wherein one end of said poker is connected to said synchronous motor; and the other end of said poker is connected to said slider.

9. The multifunction safe electric pressure cooker of claim 8, wherein axes of said synchronous motor is connected to a wheel, wherein a poker is coupled to said wheel.

10. The multifunction safe electric pressure cooker of claim 4, wherein said transmission device further comprises a revolving handle on said lid, a synchronous motor on said lid, wherein one end of said poker is coupled to the bottom of said revolving handle and said synchronous motor; and another end of said poker is coupled to said slider.

11. The multifunction safe electric pressure cooker of claim 3, wherein said one or more lid buckles are uniformly arranged on the edge of said lid.

12. The multifunction safe electric pressure cooker of claim 3, further comprising one or more slider restricting bolts coupled with said slider, wherein one or more runner slots are positioned on said ring shaped slider.

13. The multifunction safe electric pressure cooker of claim 1, further comprising:
- a temperature sensor housing, wherein the temperature sensor housing is coupled to said heating plate, wherein the upper surface of the temperature housing comprises a heat conducting body, wherein the lower portion of said temperature housing comprises an insulating body, wherein a top surface and bottom surfaces of a protruding portion of said insulating body is coupled to a first metal contact and a second metal contact;
- a temperature sensor connected to said temperature housing;
- an adiabatic device coupled to said warming container and positioned adjacent to the protruding portion of said insulating body, said adiabatic device coupled to a third metal contact;
- a fourth metal contact positioned immediately below said second metal contact;
- wherein said first metal and said third metal contact become electronically coupled when said inner tank is removed from said cooker;
- where said second contact and said fourth contact become electrically coupled when a pressure in said cooker reaches a limit,
- wherein said temperature control device further comprises said temperature sensor positioned in a hole of said heating plate, two signal down-leads, and a temperature control circuit.

14. The multifunction safe electric pressure cooker of claim 13, wherein said safety lid control switch is made of a reed switch between said lid and said body.

15. The multifunction safe electric pressure cooker of claim 13, wherein said safety lid control switch is engaged when said lid is in proximity of said body.

16. The multifunction safe electric pressure cooker of claim 13, wherein said safety lid control switch comprises a photovoltaic switch between said lid and said body.

17. The multifunction safe electric pressure cooker of claim 1, wherein an end of said temperature control device is electrically connected to said pressure switch, while the other end is electrically connected to a timer switch; said temperature control device is connected in series with one of a thermostat and said pressure switch, and parallel connects with said timer switch.

18. The multifunction safe electric pressure cooker of claim 17, wherein said switch is mechanical structured; wherein said control circuit is made of an ultrahigh temperature protector, a timer, a timer switch, heating thread in said heating plate in series; a circuit is made up of said thermostat, pressure switch and timer; said timer switch also connects to said temperature control device.

19. The multifunction safe electric pressure cooker of claim 17, wherein said temperature control device is connected electrically in parallel to said timer switch.

* * * * *